US010676204B2

(12) United States Patent
Lemarchand et al.

(10) Patent No.: US 10,676,204 B2
(45) Date of Patent: Jun. 9, 2020

(54) TURBINE ENGINE STATOR VANE, FAN CASING COMPRISING SUCH A VANE, THRUST REVERSER SYSTEM OF A TURBINE ENGINE EQUIPPED WITH SUCH A VANE AND TURBINE ENGINE EQUIPPED WITH SAID VANE, SAID CASING OR SAID SYSTEM

(71) Applicant: SAFRAN AIRCRAFT ENGINES, Paris (FR)

(72) Inventors: Kevin Morgane Lemarchand, Melun (FR); Guillaume Olivier Vartan Martin, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 705 days.

(21) Appl. No.: 15/351,790

(22) Filed: Nov. 15, 2016

(65) Prior Publication Data
US 2017/0138371 A1 May 18, 2017

(30) Foreign Application Priority Data
Nov. 16, 2015 (FR) .................................... 15 60999

(51) Int. Cl.
*F02K 1/70* (2006.01)
*B64D 33/04* (2006.01)
*F01D 17/16* (2006.01)
*F04D 29/54* (2006.01)

(52) U.S. Cl.
CPC ........... *B64D 33/04* (2013.01); *F01D 17/162* (2013.01); *F02K 1/70* (2013.01); *F04D 29/542* (2013.01); *F04D 29/544* (2013.01); *F05D 2220/32* (2013.01); *F05D 2250/71* (2013.01); *F05D 2260/50* (2013.01); *Y02T 50/671* (2013.01)

(58) Field of Classification Search
CPC ..... F02K 1/70; F02K 1/56; F02K 1/76; F02K 1/60; F01D 17/162; B64D 33/04; F04D 29/542; F04D 29/544
See application file for complete search history.

(56) References Cited

U.S. PATENT DOCUMENTS

| 3,620,022 | A  | * | 11/1971 | Beale ........................ | F02K 1/70 239/265.31 |
| 5,315,821 | A  | * | 5/1994  | Dunbar ..................... | F02K 1/70 244/110 B |
| 7,469,528 | B2 | * | 12/2008 | Lardellier ................. | B64C 7/02 239/265.25 |
| 9,038,367 | B2 | * | 5/2015  | Suciu ........................ | F02K 1/70 60/226.2 |
| 9,109,462 | B2 | * | 8/2015  | Suciu ..................... | F01D 21/045 |

(Continued)

OTHER PUBLICATIONS

Rapport de Recherche Preliminaire / Opinion Ecrite, mailed Jul. 15, 2016, issued in corresponding French Application No. 1560999 filed Nov. 16, 2015, 7 pages.

*Primary Examiner* — Eldon T Brockman
(74) *Attorney, Agent, or Firm* — Christensen O'Connor Johnson Kindness PLLC

(57) ABSTRACT

A variable-orientation stator vane of a turbine engine, comprising a wall that extends between a leading edge and a trailing edge forming a chord line. The chord line increases from a root end towards a tip end of said vane. This vane is fitted pivotably in a turbine engine casing so as to divert a flow of cold air circulating in an annular duct thereof.

18 Claims, 7 Drawing Sheets

(56) References Cited

U.S. PATENT DOCUMENTS

| | | | |
|---|---|---|---|
| 2013/0067885 A1* | 3/2013 | Suciu | F02K 1/70 60/226.2 |
| 2013/0094942 A1* | 4/2013 | MacKay | F01D 5/141 415/148 |
| 2013/0156542 A1* | 6/2013 | Suciu | F01D 21/045 415/1 |
| 2015/0113945 A1 | 4/2015 | Suciu et al. | |

* cited by examiner

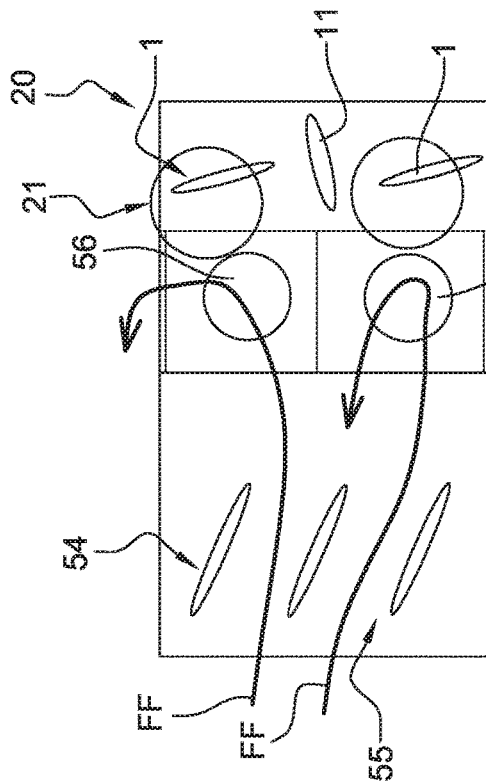
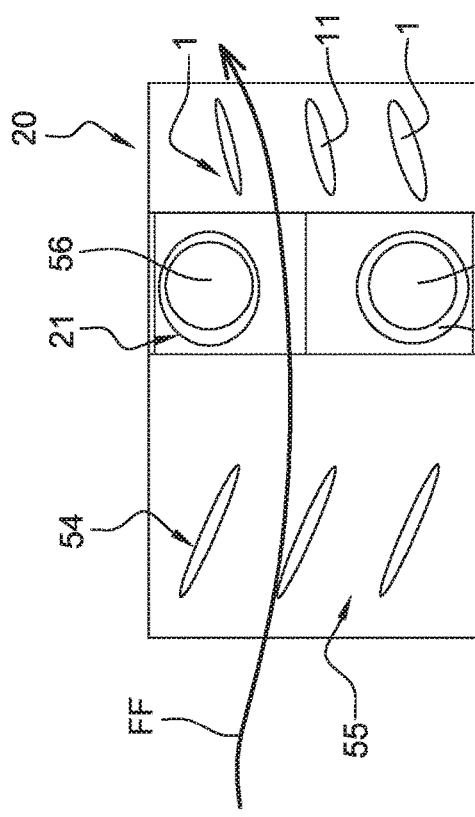
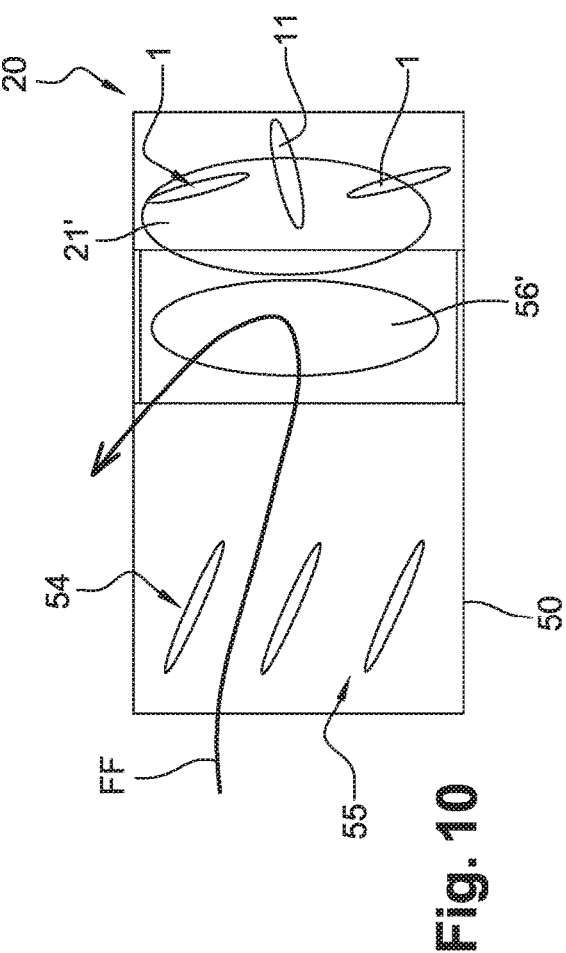
Fig. 9a
Fig. 9b
Fig. 10

TURBINE ENGINE STATOR VANE, FAN CASING COMPRISING SUCH A VANE, THRUST REVERSER SYSTEM OF A TURBINE ENGINE EQUIPPED WITH SUCH A VANE AND TURBINE ENGINE EQUIPPED WITH SAID VANE, SAID CASING OR SAID SYSTEM

FIELD OF THE DISCLOSURE

Embodiments of the present invention relate to the field of turbine engines. They concern a turbine engine vane and in particular a stator vane, preferably with variable pitch. Embodiments of the present invention also relate to a turbine engine equipped with a fan casing equipped with such a vane or with a thrust reverser system equipped with such a vane.

BACKGROUND OF THE DISCLOSURE

The natural development of multiple-flow turbojet engines that have a fan, in particular upstream, is to increase propulsive efficiency via a reduction in specific thrust, which is obtained by reducing the pressure ratio of the fan, which is manifested by an increase in the bypass ratio (BPR), which is the relationship between the mass airflow through one or more than one of the ducts surrounding the gas generator by the mass airflow through the gas generator, calculated at maximum thrust when the engine is immobile in an international standard atmosphere at sea level.

However, the increase in the bypass ratio has an influence on the diameter of the turbine engine which is constrained by the requirement to allow a minimum ground clearance because of the fact that the turbine engine is most often integrated under the wing of an aircraft.

One solution consists of assembling more than one fan on at least one offset axis, i.e. not coaxial with the axis of the turbine engine, in order to increase the bypass ratio while maintaining an appropriate ground clearance under the wing of the aircraft. However, this architecture has an impact on the mass of the turbine engine, in particular because of the weight of the casings enveloping each fan. The fan casings surround the fan vanes and are connected to the gas generator by stator vanes known as outlet guide vanes (OGV). These stator vanes are disposed downstream of the fan vanes and enable the flow generated by the fan to be straightened. These vanes are disposed radially from the axis of rotation of the fans.

The fan casings can also carry thrust reverser systems that enable the thrust of the secondary flow generated by the fans in the landing phases to be reversed in order to facilitate the braking of the aircraft and to reduce the braking distances. This thrust reverser system as described in document US 2015/113945 is in great demand by aircraft manufacturers and also by pilots in order to be able to adapt to any type of landing runway.

A conventional bypass turbine engine is equipped with a thrust reverser system, which is installed downstream of a nacelle incorporating the fan casing. This thrust reverser system generally comprises a plurality of doors that pivot towards the exterior of the nacelle and which have the disadvantage of increasing the length of the nacelle and increasing the mass of the propulsion assembly.

The integration of this thrust reverser system into multi-fan turbine engines further penalises the mass of the propulsion assembly because the number of doors is increased and limits its integration with, for example, adjacent fans.

SUMMARY OF THE DISCLOSURE

An object of various embodiments of the present invention is, in particular, to propose a new variable-orientation stator vane configuration. Another object is to provide a solution that makes it possible to reverse the thrust necessary for the propulsion of an aircraft while limiting casing drag and the mass of the propulsion assembly.

This object is achieved by virtue of a fan casing extending along a longitudinal axis and which delimits an annular duct in which a flow of cold air circulates, the casing comprising at least one variable-orientation stator vane connected to the casing, the vane being fitted pivotably along an axis of pivot transverse to the longitudinal axis and comprising a blade that extends between a leading edge and a trailing edge; between the leading and trailing edges there extends a chord line, the value of the length of the chord line increasing from a root end towards a vane profile end, which has a profile incurved along its direction of extension.

The vane is thus of a variable-pitch type.

Thus, this solution enables the above-mentioned aim to be achieved. In particular, this vane firstly allows a greater freedom of movement of the vane in the turbine engine and better guidance of a flow of cold air and, secondly, it makes it possible to divert the flow of cold air circulating in the duct while limiting the drag of the nacelle and the mass. The incurved profile further improves the guidance of the flow of air by forming, for example, a ramp.

In accordance with one embodiment, the vane is movable between a first position in which it straightens the flow of cold air traversing the annular duct and a second position in which the flow of cold air is diverted towards the exterior of the fan casing. The flow of cold air is diverted towards the exterior in particular by virtue of the incurved profile of the vane along its direction of extension.

According to one embodiment, the incurved profile of the vane along its direction of extension is configured so as to divert the flow of cold air towards the exterior of the casing.

According to one embodiment, the ratio between the value of the length of the tip chord and the value of the length of the root chord is included in the range between 1.1 and 5.

Advantageously, but not restrictively, the vane has a crown of camber included in the range between 50 and 300 mm, the crown of camber being defined by a maximum distance between one of the median points of the chord line of each transverse section of the vane relative to its direction of extension and a straight line connecting the point of the root end and the point of the tip end.

The casing can comprise a thrust reverser system having at least one occludable opening made in a shell of the casing upstream of the stator vane.

According to one embodiment, the thrust reverser system comprises at least one occlusion means articulated on the casing upstream of the vane between a closed position in which the opening is occluded and an open position in which the opening is cleared.

According to one embodiment, the occlusion means is configured, in the open position, so as to direct the flow of cold air diverted by the incurved profile of the stator vane towards the occlusion means at an angle of deviation relative to the wall of the annular duct, and the vane tip end has a tip angle formed between a straight line tangent to the tip end and a plane tangent to the wall of the annular duct, the angle of deviation being equal to the tip angle plus or minus 10 degrees.

According to one embodiment, the occlusion means pivots through an angle of pivot and the vane tip end has a tip angle formed between a straight line tangent to the tip end and a plane tangent to the wall of the annular duct, the angle of pivot being equal to the tip angle plus or minus 10 degrees.

According to one embodiment, the occlusion means has openings with a straightener profile the direction of which forms an angle of deviation with the wall of the annular duct, and the vane tip end has a tip angle formed between a straight line tangent to the tip end and a plane tangent to the wall of the annular duct, the tip angle being equal to the angle of deviation plus or minus 10 degrees.

According to one embodiment, the angle of deviation or tip angle is included in the range between 35° and 90°.

According to another embodiment, the occlusion means can comprise a hatch, a door, a grille or a diaphragm.

Advantageously, but not restrictively, the occlusion means has at least one door pivoting between the closed position and the open position through an angle of pivot, the angle of deviation being equal to the angle of pivot plus or minus 10 degrees.

Advantageously, but not restrictively, the occlusion means has grilles with straightener profiles oriented in accordance with the angle of deviation, the casing comprising a cowl sliding along the longitudinal axis between a closed position in which the grilles are occluded and an open position in which the grilles are cleared.

The thrust reverser system comprises, preferably, but not restrictively, a synchronisation mechanism configured to synchronise the pivoting of the vane and the occlusion of the opening. In this way, the occlusion or the clearance of the opening is dependent on the pivoting of the vane.

The casing comprises at least one fixed vane arranged transversely in the annular duct, substantially in a single transverse plane passing through said longitudinal axis.

Embodiments of the present invention also relate to a turbine engine thrust reverser system comprising:

at least one stator vane with at least one of the features mentioned above, said vane being arranged in an annular duct of a fan casing with a longitudinal axis and being fitted pivotably along an axis of pivot transverse to said longitudinal axis; and, a synchronisation mechanism configured to synchronise the pivoting of the vane and the occlusion of an occludable opening made in a shell of the fan casing and upstream of said vane so as to allow the circulation of a flow of cold air in the annular duct or to divert the flow of cold air towards the exterior, through the opening.

According to one embodiment, the thrust reverser system comprises at least one occlusion means movable relative to the fan casing and capable of occluding the opening made in the shell. In particular, the occlusion means can comprise a movable door, a hatch, a grille or a diaphragm.

Embodiments of the present invention also relate to a turbine engine comprising at least one stator vane with at least one of the features mentioned above or a casing with any of the features described above.

BRIEF DESCRIPTION OF THE DRAWINGS

Embodiments of the present disclosure will be better understood and other aims, details, features and advantages will become more clearly apparent on reading the following detailed explanatory description of embodiments of the invention given as purely illustrative and non-restrictive examples, with reference to the accompanying diagrammatic drawings in which:

FIGS. 9a and 9b are diagrammatic representations of the different positions of the movable vanes and the movable doors of a thrust reverser system according to another embodiment of the invention;

FIG. 10 is a diagrammatic illustration of a variant of the embodiments of the thrust reverser system shown in FIGS. 9a and 9b;

DETAILED DESCRIPTION OF THE DISCLOSURE

Figure 1:
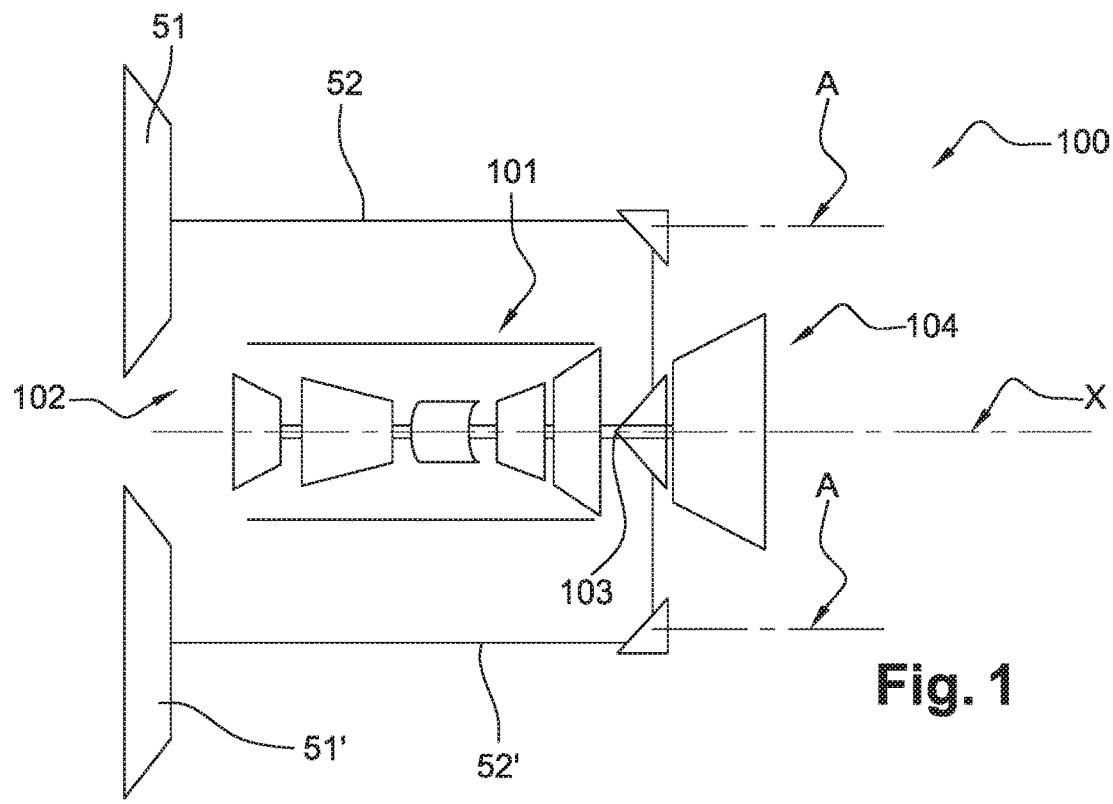
FIG. 1 is a diagrammatic representation of a turbine engine with two fans offset in relation to a gas generator according to an embodiment of the invention.

FIG. 1 shows a multi-fan turbine engine 100. Generally, this turbine engine 100 comprises a fairing 101 which has a gas generator 102 that extends substantially along an axis X. The gas generator 102 has a power transmission shaft 103 which is connected to a power transmission mechanism 104 situated downstream from the gas generator. This power transmission mechanism 104 here drives the shafts 52, 52' of two fans 51, 51' with offset longitudinal axes A, A', in particular, non-coaxial with the longitudinal axis X of the gas generator 102. The fan shafts 52 each drive a fan 51. Alternatively, the power transmission mechanism can be situated upstream of the gas generator.

Figure 2:
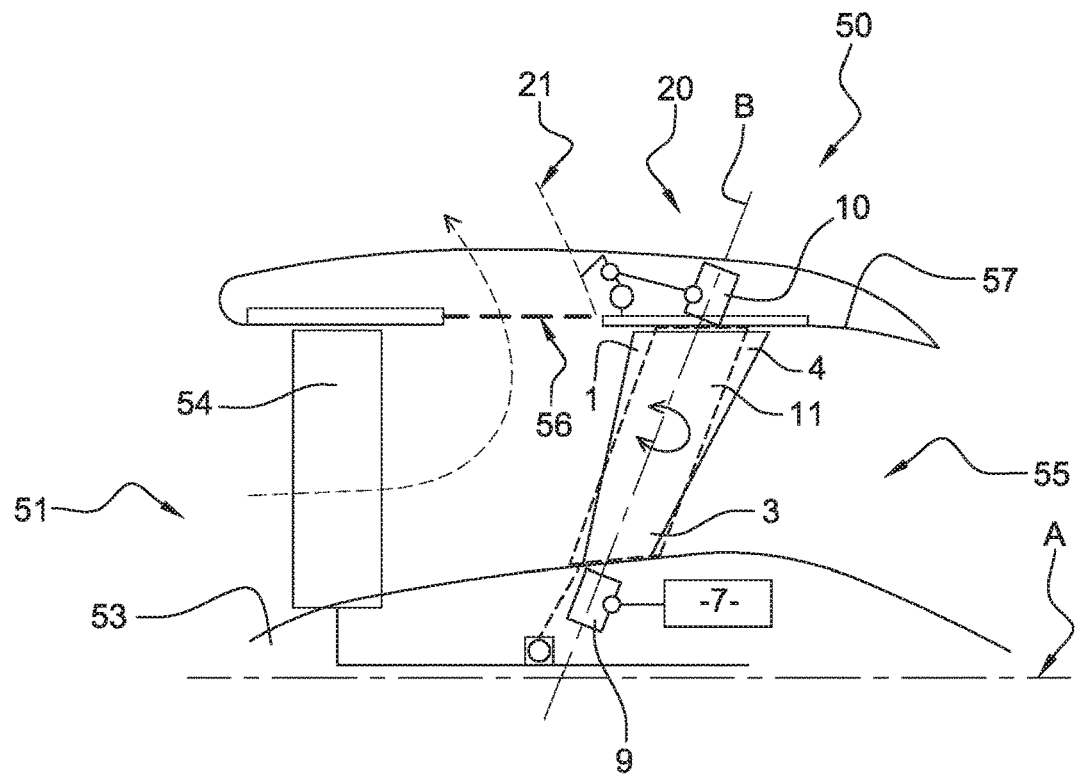
FIG. 2 is a view in axial cross-section of a fan casing accommodating a fan of a multi-fan turbine engine according to FIG. 1.

With reference to FIG. 2, each fan 51, 51' is accommodated in a nacelle having a casing 50 extending along the axis A, A' of the fan 51 and surrounding a plurality of movable fan vanes 54 which extend radially from the fan shafts 52, 52' and are fitted in rotation relative to the casing 50. The casing 50 has a generally cylindrical shape and delimits an annular duct 55 in which a flow of cold air or secondary flow circulates. The casing 50 also comprises a hub 53 traversed by a fan shaft and a shell 57 that are connected by stator vanes enabling the flow of cold air generated by the fan 51 to be straightened/rectified. The hub 53 supports the fan shaft via bearings providing an axial stop and enabling the casing to absorb the fan thrust. The stator vanes are installed in the annular duct 55 and downstream of the fan 51. In the embodiments of the present invention, and generally, the terms "upstream" and "downstream" are defined in relation to the circulation of gases in the turbine engine 100. The vanes 1 are distributed about the axis A, A' of the fan 51.

At least one of the vanes 1 is fitted pivotably along a pivot shaft B transverse to the annular duct 55 so as to divert at least a part of the thrust of the flow of cold air in order to brake the aircraft. At least one fixed vane or flow straightener is also arranged transversely in the annular duct 55, substantially in a transverse plane passing through the longitudinal axis of the fan. This vane fixed relative to the casing 50 is fixed to the hub 53 and to the fan casing and enables the forces to be absorbed. As an example, some stator vanes whose number is included in the range between ten and fifty are necessary to straighten the flow of cold air. In the present example, an equivalent number of pivoting vanes 1, known as variable-pitch or variable-orientation vanes, and flow straightener vanes 11 can be installed.

Each pivoting or movable vane 1 turns about its pivot shaft B so as to occupy at least two positions. The pivot shafts B have a first end that is fitted in the hub 53 by means of a base 9. The shell 57 of the fan casing 50, through support means 10, carries a second end of the pivot shaft B.

Figure 3:
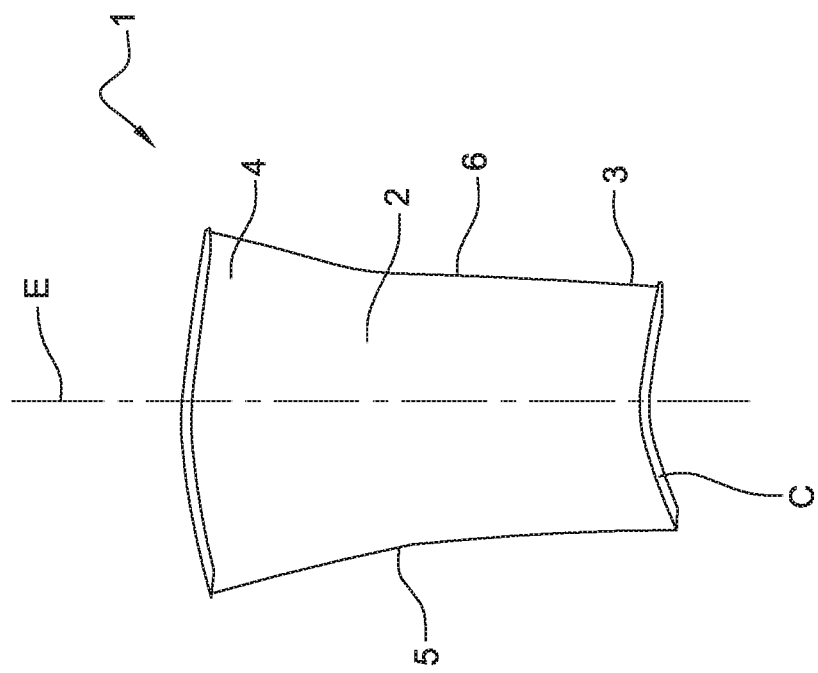

With reference to FIG. 3, each pivoting vane 1 according to the embodiments of the present invention comprises a blade 2 extended between a root end 3 and a tip end 4 in a direction of extension E. The root end 3 is connected in this example to the hub 53 whereas the tip end 4 is connected to the shell 57 of the casing 50. This blade 2 also has a leading edge 5 and a trailing edge 6 between which a pressure face area and a suction face area extend opposite one another. A chord line C also extends between the trailing edge 6 and the leading edge 5. The section of the vane comprises an incurved transverse profile.

The value of the length of the chord line C of each vane 1 varies between the root end 3 and the tip end 4. In particular, the value of the length of the chord of each vane increases from the root end 3 towards the tip end 4. In other words, the value of the length of the root end chord is less than the value of the length of the tip end chord. Likewise, the value of the length of the chord line situated in an intermediate portion of the blade between the tip end and the root end is less than the tip chord line and greater than the root chord line. This makes it possible to cover a larger section in the upper part of the fan flow (close to the internal wall of the fan casing).

According to an aspect of the invention, the ratio between the value of the length of the chord line at the tip end and the value of the length of the chord line at the root end is included in the range between 1.1 and 5. Preferably, but not restrictively, the ratio is included in the range between 1.5 and 2.5.

Figure 4:
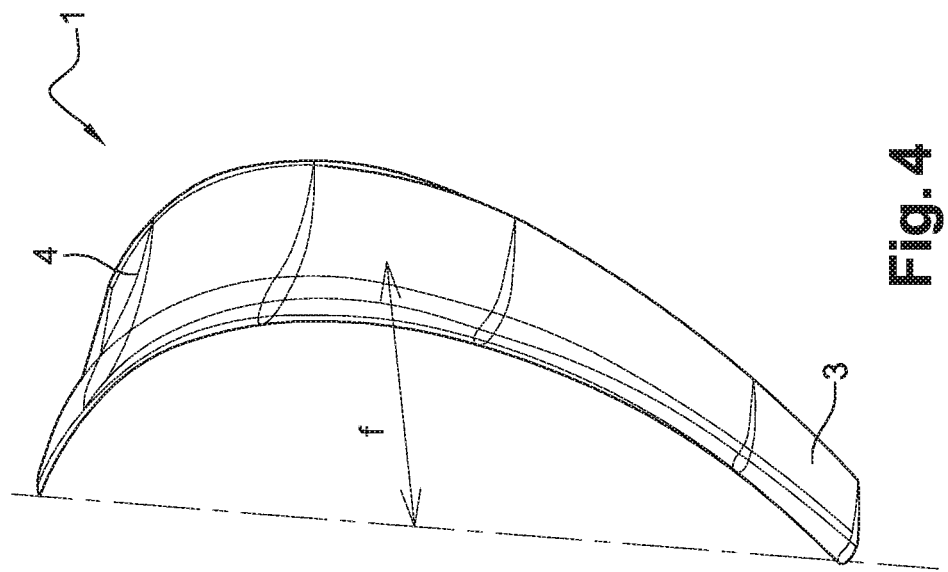
FIGS. 3 and 4 show embodiments of a turbine engine vane according to another embodiment of the invention.

According to a variant illustrated in FIG. 4, the blade 2 of the pivoting vane 1 has an incurved axial profile (along its direction of extension) in order to better guide the flow of cold air. For that purpose, the vane 1 has a crown of camber f included in the range between 50 and 300 mm. Each vane is formed by a plurality of sections that are transverse in relation to its direction of extension. The crown of camber is defined by a maximum distance between one of the median points of the chord line C of each transverse section along its direction of extension and a straight line connecting the median points of the root end chord and the tip end chord.

The pivoting of the vane 1 is controlled by a maneuvering unit 7 that is integral with the base 9 also carrying the pivot shaft B in order to drive the vane 1 in rotation. This maneuvering unit 7 comprises a motor (not shown) that is controlled by an electronic control unit 8. The maneuvering unit 7 here comprises an actuator of the type that comprises a cylinder. Alternatively, this maneuvering unit 7 can be installed in the shell of the casing 50 and joined to the support means 10 at the tip end 4.

The pivot shaft B is inclined relative to the fan axis in the example shown. In particular, the pivot shaft is in a single transverse plane passing through said longitudinal axis. Alternatively, the pivot shaft is fitted radially from the fan axis A, A'.

The vane 1 pivots between a first position, in which the cold flow traverses the annular duct 55 and where the vane straightens the fan flow, and a second position, in which the flow of cold air is diverted towards the exterior of the shell. The angle of pivot of the vane 1 between the first position and the second position is at least 60°, preferably approximately 90°. It is advantageous to provide a convexity on an internal surface of the shell, and a corresponding convexity on the vane so that said vane is able to pivot while maintaining a good seal relative to the shell.

Figure 5:
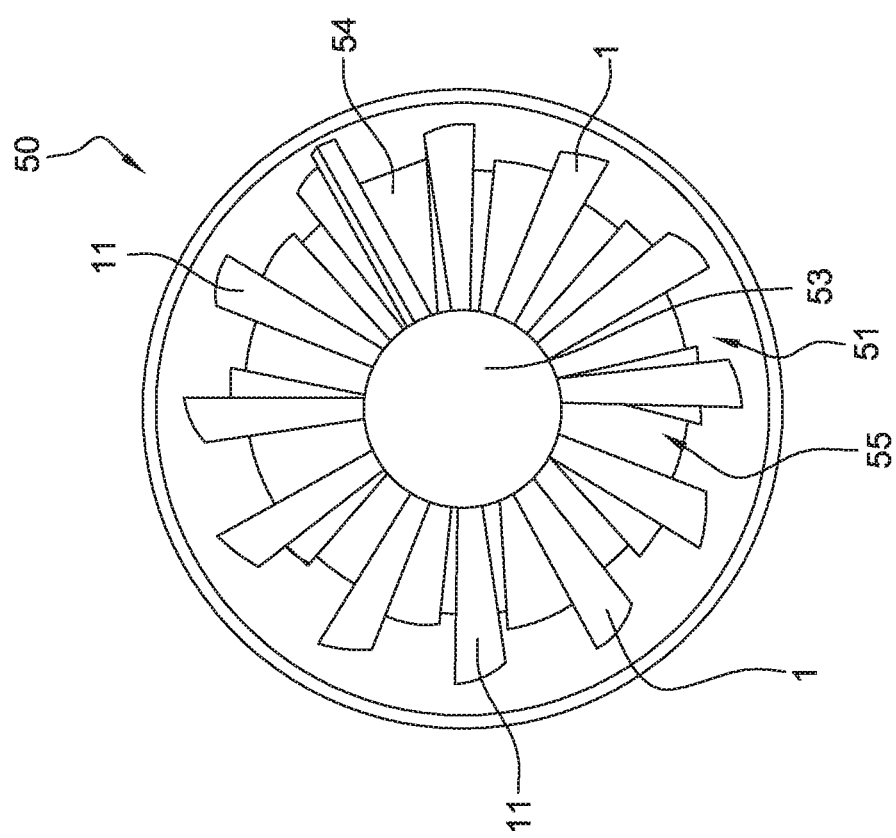

FIG. 5 shows a rear view of a casing 50 in which there are fitted a plurality of pivoting vanes 1 and a plurality of fixed flow-straightener vanes 11 distributed regularly around the hub 53 with axis A, A'. The vanes are shown very diagrammatically. The pivoting vanes as described above have an incurved profile along their directions of extension. The pivoting vanes 1 and the fixed vanes 11 are here identical. The vanes 1 occupy their first position in which they also have the function of straightening the flow of cold air generated by the fan. In this example, the flow of cold air generated by the fan vanes has an axial and tangential component and is straightened axially by the fixed vanes and the movable vanes. The leading edge of each vane 1, 11 is offset by at least 15° relative to the trailing edge over at least one of its sections. As for the trailing edge, this is situated in the axis of the gas generator in a straightener position.

Figure 6:
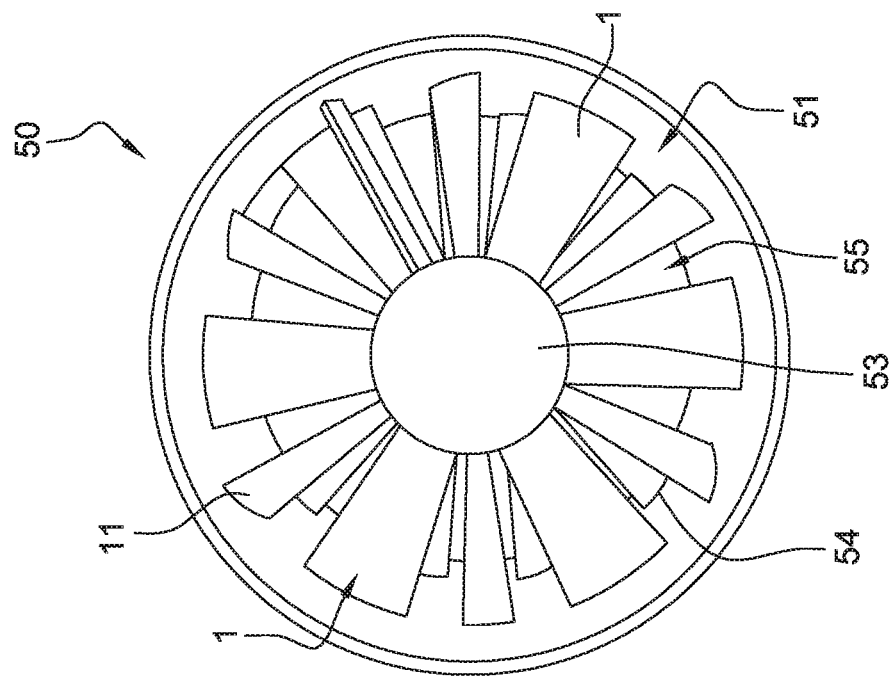
FIGS. 5 and 6 are rear views downstream of a fan casing according to another embodiment of the invention.

FIG. 6 shows a rear view of the casing accommodating the fan 51 and also the pivoting vanes 1 and fixed vanes 11. As before, the vanes are shown very diagrammatically and have an incurved profile along their directions of extension. The pivoting vanes 1 occupy their second position in which they reverse the thrust of the flow of cold air by diverting it. The fixed vanes perform a structural role.

According to yet another aspect of the invention, the flow of cold air is diverted towards the exterior of the fan casing 50, and in particular towards the atmosphere. For this purpose, the casing 50 comprises a thrust reverser system 20 that has at least one occlusion means movable relative to the fan casing. This occlusion means is able to occupy a closed position in which it occludes an occludable opening 56 made in the shell 57 of the casing 50 and an open position in which it clears the opening 56 for the passage of the diverted flow of cold air. The occlusion means can comprise a hatch or a door 21, a grille or a diaphragm. Here, it is a door 21 that is articulated on the shell of the fan casing 50. The door 21 pivots about an axis perpendicular to the axis A. The opening 56 is positioned upstream of the pivoting vane 1. Said opening extends over the shell 57 of the casing along an angular sector included in the range between 5° and 30° in a plane perpendicular to the longitudinal axis of the fan casing. Preferably, the angular sector is included in the range between 10° and 15°. The openings 56 are distributed regularly over the shell 57 of the fan casing. The hinge of the door 21 is also situated upstream of the vane 1. The doors each extend over an angular sector substantially greater than that of the openings. In this example, a door 21 occludes and clears an opening 56 at the same time.

The system 20 also has a synchronisation mechanism 22 that enables the occlusion or the clearance of the opening 56 to be controlled according to the pivoting of each vane 1. The synchronisation mechanism 22 can be mechanical or electronic.

Figure 7:
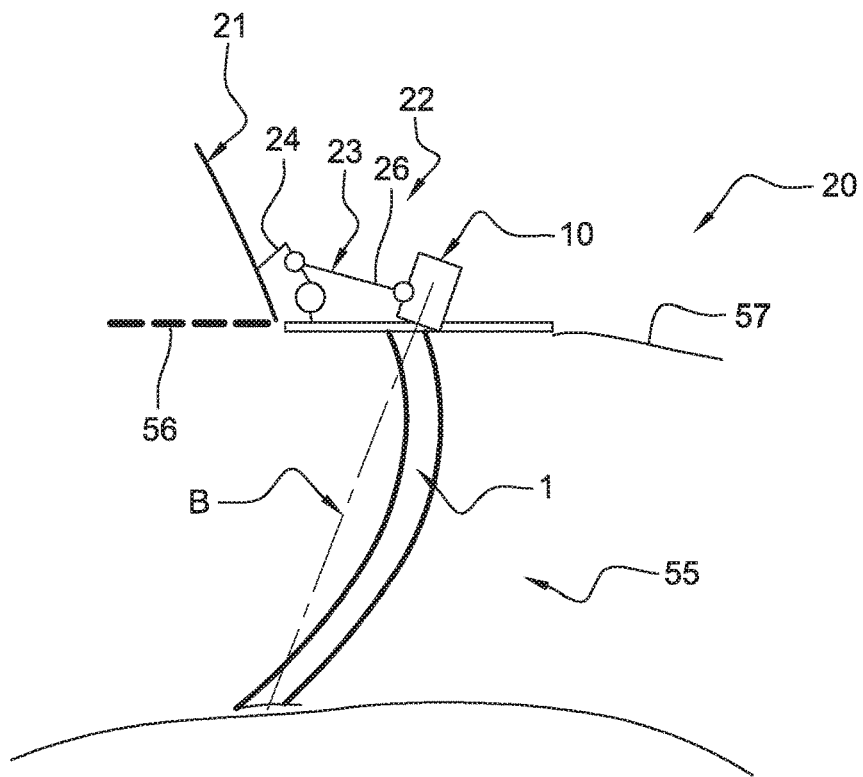
FIGS. 7 and 8 are diagrammatic representations of embodiments of a thrust reverser system in a fan casing according to another embodiment of the invention.

FIG. 7 shows a mechanical synchronisation mechanism 22 according to one embodiment of the invention. The mechanism 22 comprises maneuvering means 23 connecting in this example at least one movable door 21 to the support means 10 of each vane 1. The maneuvering means 23 here comprise a first connecting rod 24 connected to the door 21 and connected to the shell 57 of the casing 50, and a second connecting rod 26 connected to the support means 10 of the vane 1. The first and second connecting rods are connected to one another by means of a pivot connection. The first connecting rod 24 is also connected to the internal shell 57 by means of a pivot connection. In this way, when the vane 1 pivots about its pivot shaft B between its first position and its second position, the support means 10 drive the movement of the maneuvering means 23 (here the connecting rods 24 and 26) which actuate the closure or the deployment of the door 21, and therefore the clearance or occlusion of the opening 56 so that the flow can be discharged or circulate in the duct.

Figure 8:
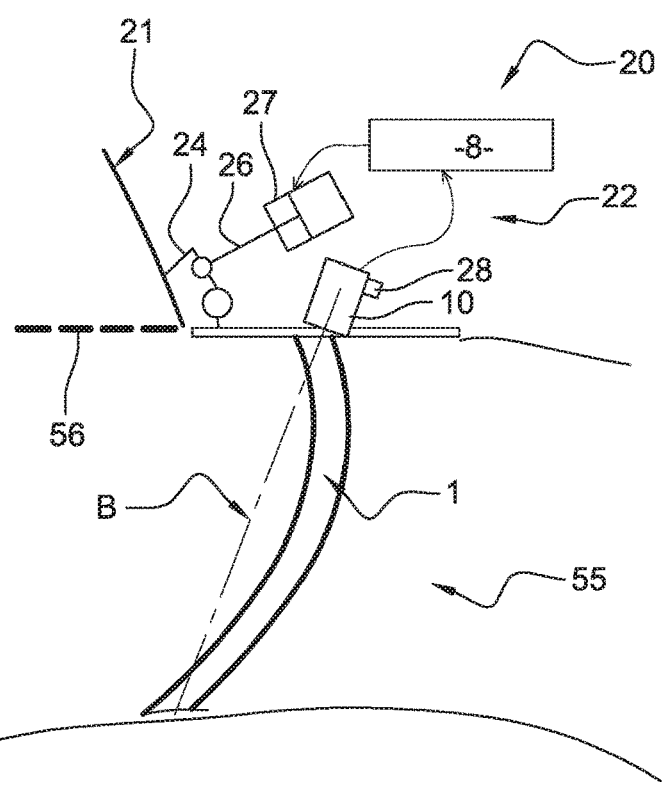

FIG. 8 shows an electronic synchronisation mechanism 22 according to an embodiment of the invention. The mechanism 22 comprises maneuvering means 23 as mentioned above. In this example, the first connecting rod 24 is connected to a maneuvering element 27 which is controlled by the electronic control unit 8. The maneuvering element 27 is a cylinder-type actuator. A sensor 28 is disposed on the support means 10 so as to detect the pivoting of the vane 1 or the position of the vane in the annular duct. This sensor 28 is able to transmit a signal representative of the position or of the rotation of the vane 1 to the control unit 8. The control unit 8 receiving the signal emitted by the sensor 28 transmits a control instruction to the maneuvering element 27 in order to simultaneously control the deployment or the closure of the door 21. In other words, when the vane 1 pivots to occupy its first or second position, the sensor 28 sends a signal to the control unit 8 which, depending on this control signal, simultaneously orders the deployment or the closure of the door 21, and thus the clearance or occlusion of the opening 56.

The electronic control unit 8 here comprises a computer.

With reference to FIG. 9a, the movable doors 21 are in their closed position in which the openings 56 are occluded and the pivoting stator vanes 1 occupy their first position. In this state, the flow of cold air FF traversing the fan vanes 54 is straightened by the pivoting and fixed vanes 1, 11 and circulates without obstacle in the annular duct 55. With reference to FIG. 9b, the movable doors 21 are in their open position in which the openings 56 are cleared and the pivoting stator vanes 1 occupy their second position. In this case, the flow of cold air FF traversing the fan vanes 54 is diverted by the pivoting vanes 1 which through their ramp shape direct it towards the exterior of the fan casing 50 via the opening 56.

According to another embodiment of the thrust reverser system 20 shown in FIG. 10, this comprises a movable door 21' occluding an opening 56' extending circumferentially on the shell over an angular sector included in the range between 10° and 90° in a plane perpendicular to the longitudinal axis of the fan casing. The openings are situated on the shell between the connection with the hub made by the fixed vanes and a portion of the shell at right-angles to the fan holding the fan vanes. The size of the openings is therefore limited so as to maintain a certain structure of the shell 57. This opening 56' enables the flow of cold air diverted by two pivoting vanes 1 to be discharged. A single movable door 21' extending circumferentially on the shell over an angular sector included in the range between 300° and 360° can enable the majority of the openings 56' to be occluded. In this way, the number of movable parts of the reverser is limited. The fixed vanes 11 can be situated partly between the openings 56, 56'.

Figure 12:
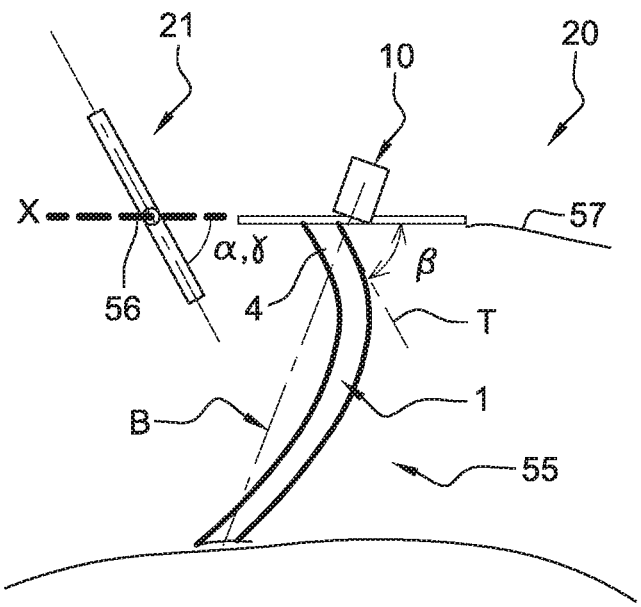
FIG. 12 shows another embodiment of a thrust reverser system with a pivoting door.

FIG. 12 shows another embodiment of the thrust reverser system with at least one variable-orientation stator vane connected to the fan casing. In this drawing, the occlusion means also comprises at least one door 21. The maneuvering means of the mechanism are connected to the movable door 21 and to the support means 10 of each vane 1 in accordance with the previous example. As described previously, the pivoting vane has an incurved profile along its direction of extension. In this example, the tip end forms an acute tip angle β with the annular duct 55. In particular, the tip angle β is formed between a straight line T tangent to the tip end 4 of the vane and a plane tangent to the wall of the annular duct 55 (at the place where the tip end is attached). The door 21 fitted pivotably relative to the shell of the casing pivots about its axis of rotation between its closed position and its open position through an angle of pivot γ. In the open position, the angle of pivot γ corresponds to an angle of deviation α, relative to the wall of the annular duct 55, of the air flow diverted towards the door by the incurved profile of the vane, in its second position. The angle of deviation α is dependent on the tip angle β formed at the tip end with the annular duct. In particular, the angle of deviation α is equal to the tip angle β+/−10°. The angle of pivot γ is equal to β+/−10°. The angle of deviation α is included for example in the range between 35° and 90°. In other words, the air will be ejected to the exterior of the nacelle in accordance with the direction of the door 21 (angle of pivot of the door) and also the inclination of the tip end of the stator vane. During the pivoting of the vane 1 from its first position to its second position, the deployment of the door 21 is activated, which enables the flow to be discharged towards the exterior through, here, two channels situated either side of the door 21.

Figure 13:
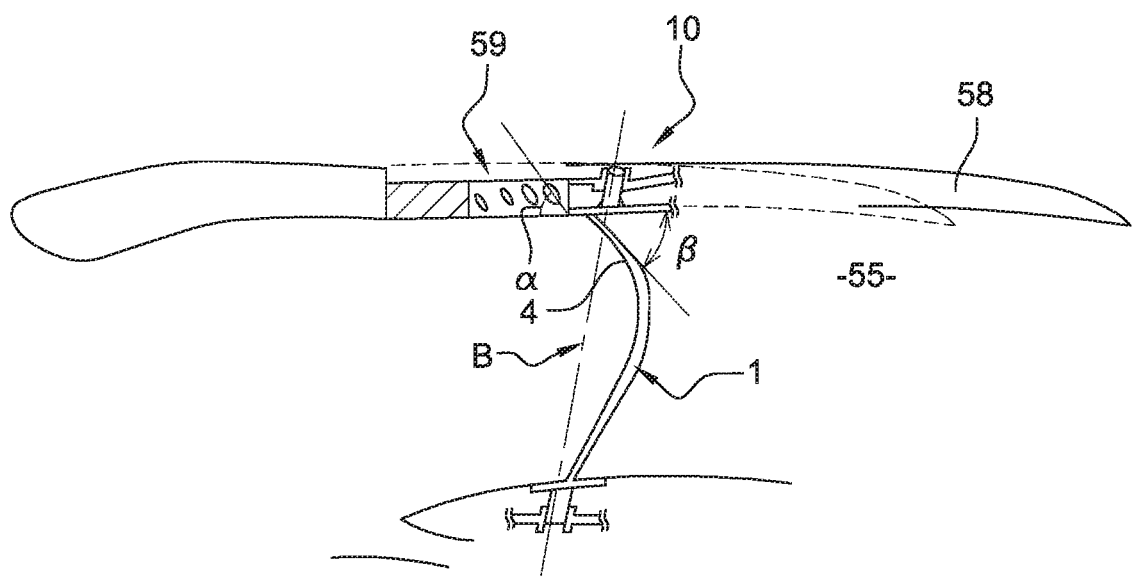
FIG. 13 shows another embodiment of a thrust reverser system with a grille.

FIG. 13 illustrates a further embodiment of the thrust reverser system with at least one variable-orientation stator vane connected to the fan casing. In this example, the occlusion means has grilles 59 that are arranged upstream of the vane 1. These grilles 59 are fixed to a substantially cylindrical framework fitted in the fan casing. A cowl 58 is fitted to the framework and can slide axially between a first position in which the grilles are occluded (position shown using dotted lines) and a second position in which the grilles are cleared (position shown using continuous lines). In accordance with the same example shown in FIG. 12, the tip end 4 forms a tip angle β formed between the straight line T tangent to the tip end 4 of the vane and a plane tangent to the wall of the annular duct 55. The grilles have openings with a reverser profile the direction of which forms an angle of deviation α with the wall of the annular duct 55. The angle of deviation α is included in the range between 35° and 90°. The angle β formed at the tip end 4 can be dependent on the angle α. The angle β can be equal to α+/−10°. In other words, the air will be ejected to the exterior of the nacelle in accordance with the direction of the reverser profiles of the grilles and of the inclination at the tip end of the stator vane. During the pivoting of the vane 1 from its first position (represented by dotted lines) to its second position, the cowl 58 moves from upstream to downstream in order to free the grilles 59 which enables the flow to be discharged towards the exterior through the openings of the grilles.

Figure 11:
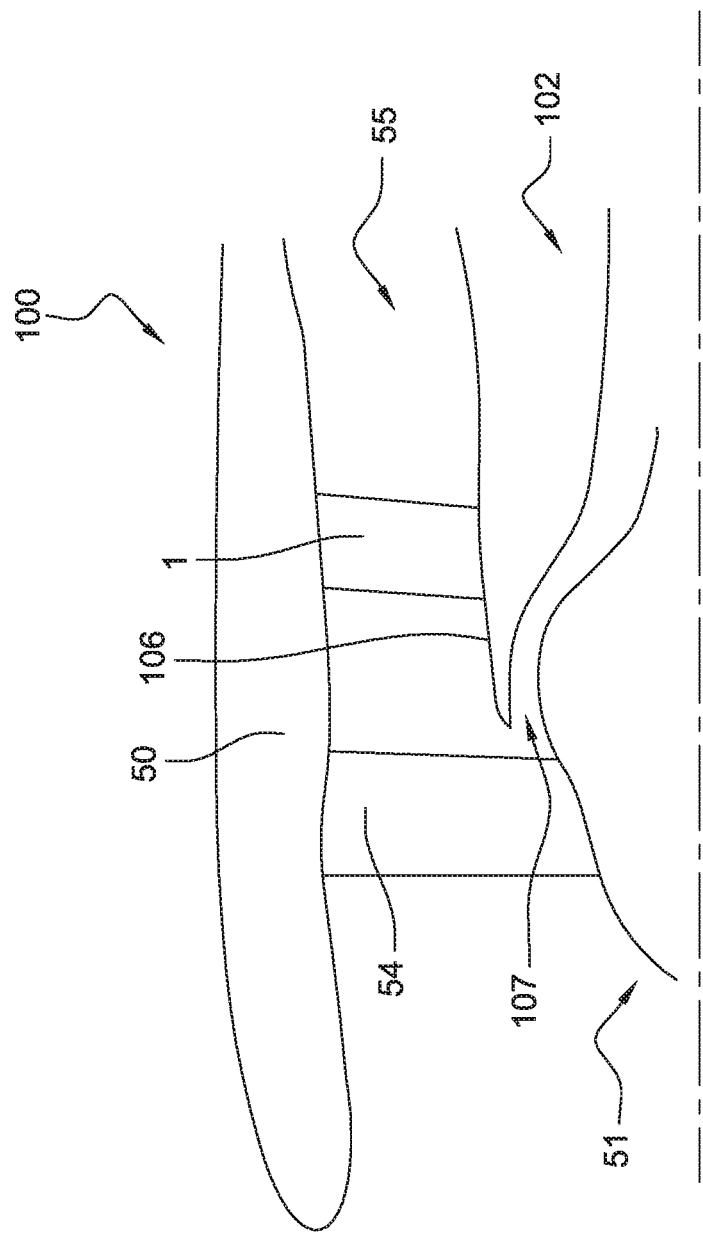
FIG. 11 is a diagrammatic representation in partial axial cross-section of an example of a bypass turbine engine according to an embodiment of the invention.

FIG. 11 shows a partial view in cross-section of a turbine engine 100, in particular a conventional bypass turbine engine 100 to which the embodiments of the invention also apply. Elements identical to those described previously have the same reference numbers in the remainder of this description. The gas generator 102 is accommodated in a hub 106 which is itself accommodated in a nacelle that includes the casing 50. A fan 51 provided with movable fan vanes 54 is fitted upstream of the gas generator 102. The turbine engine 100 comprises a duct 107 in which circulates the flow of hot air that traverses the gas generator 102 and the annular duct 55 in which the flow of cold air circulates, here disposed between the hub 106 of the gas generator 102 and the fan casing 50. In the annular duct 55 pivoting vanes 1 similar to those described previously are installed downstream of the fan 51. These vanes 1 are mounted radially or are inclined in the annular duct 55 and are distributed regularly about the axis X of the turbine engine 100.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A casing of a fan extending along a longitudinal axis and which delimits an annular duct in which a flow of cold air circulates, the casing comprising at least one variable-orientation stator vane of a turbine engine connected to the casing, the at least one variable-orientation stator vane being fitted pivotably along an axis of pivot transverse to the longitudinal axis and comprising a blade that extends between a leading edge and a trailing edge, between the leading and trailing edges there extends a chord line wherein the value of the length of the chord line increases from a root end towards a tip end of said at least one variable-orientation stator vane and the at least one variable-orientation stator vane has a profile incurved so as to form a ramp along a direction of extension of said at least one variable-orientation stator vane.

2. The casing according to claim 1, wherein the at least one variable-orientation stator vane is movable between a first position in which it straightens the flow of cold air traversing the annular duct and a second position in which the flow of cold air is diverted towards the exterior of the fan casing.

3. The casing according to claim 1, wherein the incurved profile of the at least one variable-orientation stator vane along its direction of extension is configured so as to divert the flow of cold air towards the exterior of the casing.

4. The casing according to claim 1, wherein the ratio between the value of the length of the tip chord and the value of the length of the root chord is in the range between 1.1 and 5.

5. The casing according to claim 4, wherein the at least one variable-orientation stator vane has a crown of camber included in the range between 50 and 300 mm, the crown of camber being defined by a maximum distance between one of the median points of the chord line of each transverse section of the at least one variable-orientation stator vane relative to its direction of extension and a straight line connecting the median points of chord line at the root end and the tip end.

6. The casing according to claim 1, comprising a thrust reverser system having at least one occludable opening made in a shell of the casing upstream of the at least one variable-orientation stator vane.

7. The casing according to claim 6, comprising at least one occlusion means articulated on the casing upstream of the at least one variable-orientation stator vane between a closed position in which the opening is occluded and an open position in which the opening is cleared.

8. The casing according to claim 7, wherein the occlusion means is configured, in the open position, so as to direct the flow of cold air diverted by the incurved profile of the at least one variable-orientation stator vane towards the occlusion means, at an angle of deviation relative to the wall of the annular duct, and wherein the at least one variable-orientation stator vane tip end has a tip angle formed between a straight line tangent to the tip end and a plane tangent to the wall of the annular duct, the angle of deviation being equal to the tip angle plus or minus 10 degrees.

9. The casing according to claim 8, wherein the occlusion means has at least one door pivoting between the closed position and the open position through an angle of pivot, the angle of deviation being equal to the angle of pivot plus or minus 10 degrees.

10. The casing according to claim 8, wherein the occlusion means has grilles with straightener profiles oriented in accordance with the angle of deviation, and in that the casing comprises a cowl sliding along the longitudinal axis between a closed position in which the grilles are occluded and an open position in which the grilles are cleared.

11. The casing according to claim 9, wherein the angle of deviation is in the range between 35° and 90°.

12. The casing according to claim 6, wherein the thrust reverser system comprises a synchronisation mechanism configured to synchronise the pivoting of the at least one variable-orientation stator vane and the occlusion of the opening.

13. The casing according to claim 1, comprising at least one fixed vane arranged transversely in the annular duct, substantially in a single transverse plane passing through said longitudinal axis.

14. A thrust reverser system of a turbine engine comprising:
   at least one variable-orientation stator vane, said at least one variable-orientation stator vane being arranged in an annular duct of a fan casing with a longitudinal axis according to claim 1 and fitted pivotably along an axis of pivot transverse to said longitudinal axis; and
   a synchronisation mechanism configured to synchronise the pivoting of the at least one variable-orientation stator vane and the occlusion of an occludable opening made in a shell of the casing upstream of the at least one variable-orientation stator vane so as to allow the circulation of a flow of cold air in the annular duct or to divert the flow of cold air towards the exterior, through the opening.

15. The casing according to claim 1, comprising a plurality of movable fan vanes which extend radially from fan shafts, said at least variable stator vane being placed downstream the movable fan.

16. The casing according to claim 15, wherein an occludable opening is placed between the movables fan blades and the at least variable stator vane according to the longitudinal axis.

17. A turbine engine comprising:

a casing which comprises:

at least one variable-orientation stator vane of a turbine engine connected to the casing, said at least one variable-orientation stator vane being fitted pivotably along an axis of pivot transverse to the longitudinal axis and comprising a blade that extends between a leading edge and a trailing edge, between the leading and trailing edges there extends a chord line, wherein the value of the length of the chord line increases from a root end towards a tip end of said at least one variable-orientation stator vane, and wherein said at least one variable-orientation stator vane has a profile incurved so as to form a ramp along its direction of extension.

18. A turbine engine comprising:

a thrust reverser system which comprises at least one variable-orientation stator vane, said at least one variable-orientation stator vane being arranged in an annular duct of a fan casing with a longitudinal axis and fitted pivotably along an axis of pivot transverse to said longitudinal axis; and a synchronisation mechanism configured to synchronise the pivoting of the at least one variable-orientation stator vane and an occlusion of an occludable opening made in a shell of the casing upstream of the stator vane so as to allow the circulation of a flow of cold air in the annular duct or to divert the flow of cold air towards the exterior, through the opening wherein said at least one variable-orientation stator vane has a profile incurved so as to form a ramp.

* * * * *